United States Patent [19]

Kerhoas et al.

[11] 3,806,913

[45] Apr. 23, 1974

[54] GYROSCOPIC NORTH-SEEKING DEVICE

[75] Inventors: Jean-Claude Kerhoas, Choisy le Rois; Jean-Claude Ducros, Linas, both of France

[73] Assignee: Societe De Fabrication D'Instruments De Mesure S.F.I.M., Massey, France

[22] Filed: June 23, 1972

[21] Appl. No.: 265,859

[30] Foreign Application Priority Data

June 23, 1971 France ............................ 71.22815

[52] U.S. Cl.. 340/347 P, 250/231 GY, 250/231 SE, 33/204 K, 250/214

[51] Int. Cl. ............................................ G08c 9/00

[58] Field of Search ....... 250/231 GY, 231 SE, 214; 340/347 P; 33/204 K, 204 S, 204 GB; 235/150.25; 74/5.6; 356/167

[56] References Cited

UNITED STATES PATENTS

| | | | |
|---|---|---|---|
| 3,009,141 | 11/1961 | Little et al. | 340/347 P |
| 3,099,831 | 7/1963 | Jones | 340/347 P |
| 3,323,378 | 6/1967 | Powell | 74/5.6 |
| 3,205,718 | 9/1965 | Wierenga et al. | 250/231 GY |
| 3,269,179 | 8/1966 | Anderson | 235/150.25 |
| 3,509,562 | 4/1970 | Hafle | 340/347 P |

*Primary Examiner*—Charles D. Miller
*Attorney, Agent, or Firm*—Breitenfeld & Levine

[57] ABSTRACT

The invention provides a gyroscopic north-seeking device comprising two photoelectric devices for picking up graduations at diametrally opposite points of the disc, and two channels for processing the picked up signals, said channels comprising logic circuits which determine the direction of rotation of the disc at each pick-up point, plus at least one device for the algebraic addition of the signals picked up from said points. Supplementary logic circuits are provided at the input of the algebraic adder device, to effect the addition (or subtraction) of the picked up signals as a function of coincidence (or non-coincidence) of the directions of rotation of the disc at the diametrally opposite pick-up points.

10 Claims, 9 Drawing Figures

GYROSCOPIC NORTH-SEEKING DEVICE

The present invention relates to gyroscopic apparatus enabling the direction of geographic north to be determined precisely.

The present invention provides gyroscopic north-seeking apparatus comprising a pendular device which comprises a gyroscope whose rotor axis is in use maintained horizontal and constrained to move with one degree of freedom and a disc being marks, two photo-electric detectors for detecting said marks at points which are diametrically opposed on the disc and two chains operating on the signals obtained from said detectors, said chains comprising logical circuits for determining the direction of rotation of said disc at each detected mark and at least a device for algebrically adding the signals from said detectors.

For avoiding the errors due to the non-significative movements of the pendular device, that is the movements other than the movement of rotation, it is known to make two readings simultaneously at points which are diametrically opposed on the disc.

The present invention aims at improving the protection against such errors during the measurements as well as during the setting up of the counting.

This is obtained according to the invention by means of two supplementary logical circuits at the entrance of the said device for algebricall adding the signals from said detectors, depending on the comparison of the directions of rotation of said disc at the diametrically opposed points on the disc.

Other features of the invention will be apparent from the disclosure given below with reference to the drawings.

Figure 1:
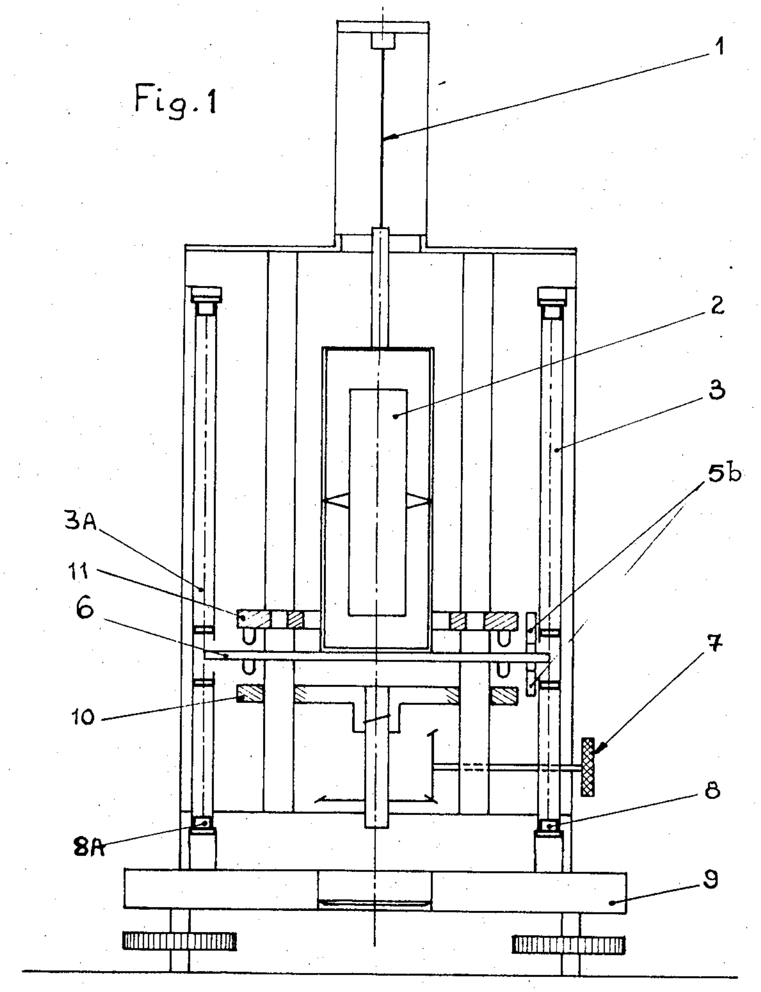
FIG. 1 shows a known gyroscopic north seeking device.

Before describing the gyroscope assembly, the theoretical basis will be given for the determination of geographic north in the device shown in the drawings.

The application of the theory of angular momentum to a gyroscope system suspended by a torsion wire, considered in the absence of perturbations, and the solution of the differential equations obtained gives, after simplification, and expression of the form:

$$\theta_0=\frac{1}{2}\,[\Delta\theta]_0^{T/2}\cdot\left(1+\frac{Kr}{Kg}\right)$$

in which:

$\theta_o$ represents the angular offset of north relative to the reference axis on the casing of the apparatus;

$[\Delta\theta]_o^{T/2}$ represents the angle swept by a point on the moving part during a half period $T/2$ of the oscillation, this angle being calculated by algebraic counting of graduations on a disc solid with the pendular gyroscope;

$Kr$ represents the torsional constant of the wire, and $Kg$ represents the gyroscopic couple constant.

In practice, some complex parasitic movements are superimposed on the oscillation of the gyroscope, because of external perturbations (vibrations, shocks) transmitted to the gyroscope through the suspension wire, or when the rotor is uncaged. These parasitic movements appear as oscillations which must be discriminated from the basic rotation to avoid error. Considering two points positioned in two diametrically opposite sectors of the disc, the equations of movement of these points give for the reciprocating rotational movement alone, an expression of the form:

$$\theta 1+\theta 2=2A\cdot(\sin wt-\sin wt_o)$$

where $t_o$ is the time at the start of measurement, when one of the points considered passes through the reference direction; and $A$ is the amplitude of the reciprocatory rotational movement.

Putting $t=t_o+T/2$, that is to say considering the angles swept during a halp period of the oscillatory rotational movement, it follows that:

$$[\theta_1+\theta_2]_{t_o}^{t_0+\frac{T}{2}}=-4A\cdot\sin wt_0$$

If the point considered is exactly parallel to the rotor axis, the expression found gives the direction of north relative to the reference direction on the casing apart from the factor 4; this simple value has to be corrected by the term $1+(Kr/Kg)$ which depends on the constants of the apparatus.

It is convenient then to have on the graduated disc connected to the pendular gyroscope, a mark whose position relative to the rotor axis is known, so that the instant for starting counting can be determined when this mark passes the reference direction on the casing. It is then sufficient to count algebraically the graduations on the disc passing a fixed point during a half period starting from the initial instant, in order to calculate from this, taking account of the coefficient $4(1+[Kr/Kg])$, the angular deviation between the direction of north about which the gyroscope is oscillating and the reference direction on the casing.

In practice, as will be seen below, the graduations on the disc are counted with the use of a photo-electric device giving, after shaping, rectangular signals corresponding to the graduations, and the precision is improved by counting, not the signals themselves but their changes in state, that is to say, the front and rear edges of the signals which introduces a new factor of 2 by which the results of the calculation must be divided.

Simultaneously, the period of the oscillation is measured as a parameter, and the last value found continuously updates the preceding value, to define in each measurement cycle the counting period. The calculator is programmed to obtain the weighted averages of the results from a number of consecutive measurement cycles such as four.

Figure 2:
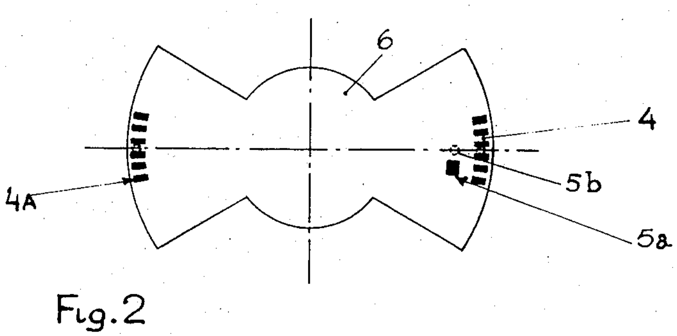
FIG. 2 shows the disc of the device according to FIG. 1.

In FIG. 1 the gyroscopic assembly shown is mounted on a base 9, provided with levelling screws and a spirit level for setting it horizontal, and with a declinometer for the pre-orientation step. These latter elements are not shown, so as to simply the drawing. The pendular assembly comprises the gyroscope rotor 2 with horizontal spin axis, suspended by a wire 1, and provided at a lower part with a glass disc 6. This latter comprises two diametrically opposed graduated scales 4, 4A, as shown in FIG. 2, which co-operate with two pickup photo-electric devices shown schematically at 3 and 3A. The disc 5 is preferably reduced to a part comprising the two graduated sectors as shown in FIG. 2, and its position is chosen relative to the rotor axis so that it does not perturb the gyroscopic movement and so that the parasitic oscillations should be as small as possible.

A small sector 5A of the disc 6 presents a black/white or opaque/transparent transition whose position relative to the rotor axis is known so that the counting can be started at an instant determined when the sector 5A passes a light source and co-operating photocell 5B defining the reference direction on the casing. The photo-electric pickup devices 3, 3A respectively associated with the scales 4, 4A comprise photo-electric detectors 8, 8A fixed on the base 9. Each detector may comprise a light source constituted by a pair of electro-luminescent diodes modulated at different frequencies, which give images spaced by a half pitch transversely of the scale, the images being ultimately projected onto a single junction detector. The signals supplied by the detectors 8, 8A are processed by the calculator whose circuit is described below in more detail with reference to FIg. 3.

Whilst the apparatus is at rest or is being transported, the pendular part is clamped mechanically to protect the suspension wire 1. A caging device enables the suspension wire to be tensioned before each measurement, and also enables the rotor 2 to be freed while both limiting the amplitude of rotational oscillations, and also damping the parasitic oscillations. The caging device comprises a control knob 7 (which can be replaced if desired by a small electric motor) which displaces vertically a movable plate 10 through a linkage comprising conical pinion wheels, and a screw. In the caged position, the disc 6 is pressed by the plate 10 against abutments on another plate 11 solid with the casing of the apparatus.

Figure 3:
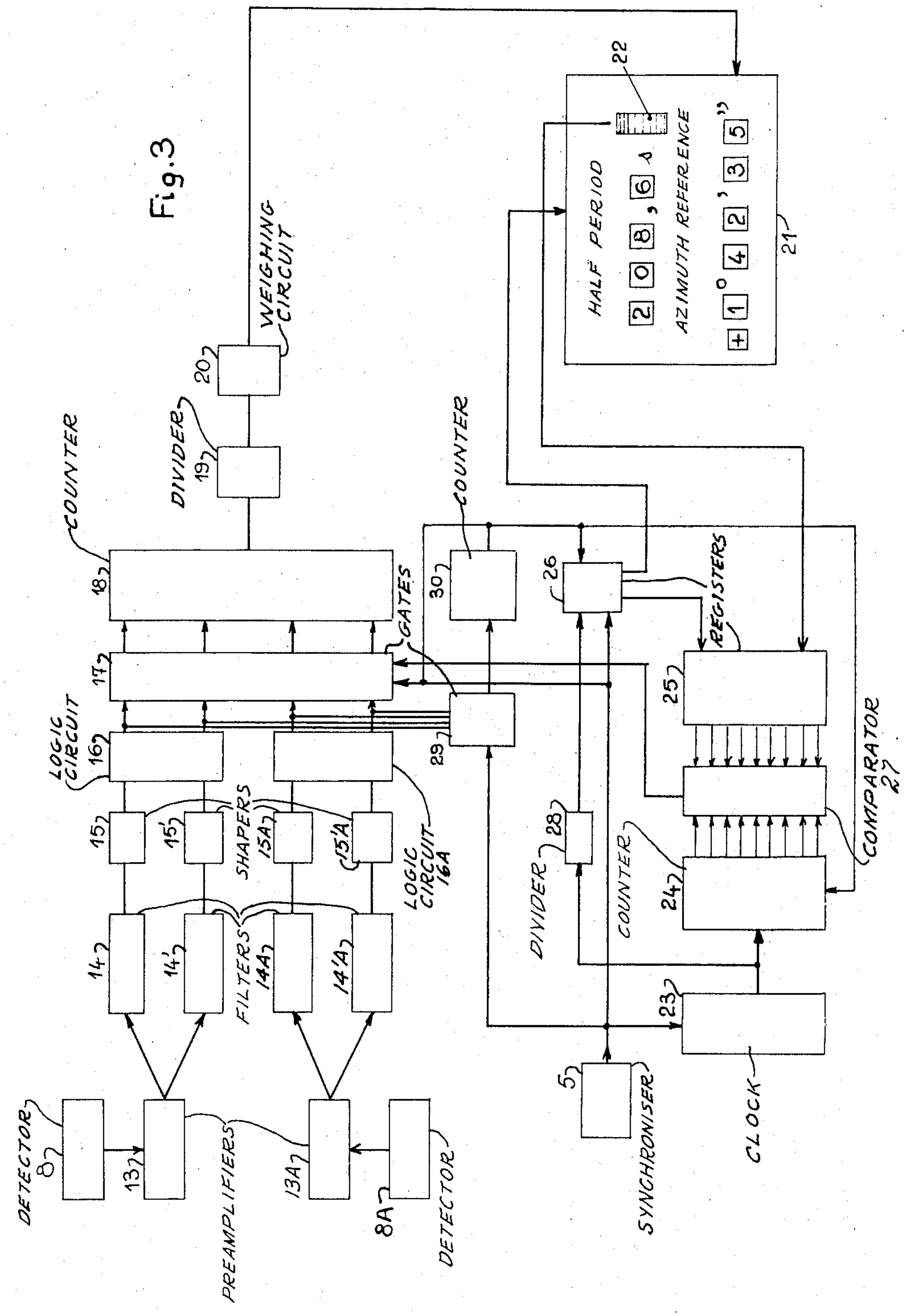
FIG. 3 is a block circuit of the calculator device of FIG. 1.

In FIg. 3, each junction detector 8, 8A is connected to a signal translating channel comprising a preamplifier 13, 13A, the output of which is connected to filters 14, 14A, and 14', 14'A tuned respectively to the modulation frequency of the electroluminous diodes, amplification and shaping circuits 15, 15'A, 15A and logic circuits 16, 16A for detecting the sense of rotation to enable the graduations to be counted appropriately in the positive or negative sense. At the output of the four signal translation channels are connected two counting and logic units 18 and 30 controlled respectively by gates 17 and 29.

The first unit 18 comprises two counters which add algebraically the pick-up signals derived from the scales 4 and 4A, and an adding circuit which adds the outputs algebraically. At the output of the adding circuit, there is a dividing circuit 19 which divides by a coefficient 8 or $8(1 + Kr/Kg)$, which, as explained above, appears in the measurement of the angles swept from the commencement of counting the graduations. The result is displayed on a panel 21 as "azimuth reference" expressed algebraically for example in degrees, minutes and seconds of arc, if desired after passing through a device 20 for taking the weighted average of successive calculations.

The gate circuit 17 is unblocked by the first signal from the element 5 which determines the instant of starting counting, and is intended to connect the four signal channels to the counting section 18 only for a half period.

The auxiliary device 30 similar to the device 18, adds algebraically and continuously the pickup signals, after the gate circuit 29 is unblocked by the signal from the element, and is used as a zero detector circuit.

The signal from the element 5, determines the start of counting, and is also used to start a clock 23 giving pulses at a frequency F, and connected to a counter 24. A knob 22 on the panel 21 enables a predetermined value of the half period to be displayed and entered in a register 25 to fix the counting time in the first measurement cycle. 27 is a numerical comparator circuit whose inputs are connected to the counter 24 and the register 25, and whose output is connected to gate circuit 17.

A supplementary register 26 is connected to the register 25 and the display panel 21 and is fed through a gate circuit (not shown) which is unblocked by the signal from the element 5, by pulses at a repetition frequency of $F/2$ which is half that of the clock 23, for example by signals from the clock passed through a circuit 28 which divides by two. This gate circuit is first blocked again, then unblocked again by the zero detector circuit of the unit 30, for example by means of a bistable circuit (not shown) which divides by two, at the second passage through zero of the adding circuit of this unit.

The operation of the device is as follows:

before the first measurement cycle, the half period $T/2$ read from a table as a function of the local latitude is indicated on the panel 21 and entered in the register 25 with the aid of the knob 22. The gyroscope being previously orientated and freed after uncaging the rotor, the first pulse from the element 5 enables the algebraic counting of the graduations to begin in the unit 18 by unblocking the gate circuit 17 and in the unit 30 by unblocking the gate circuit 29. Simultaneously, the counter 24 begins to add the pulses at frequency $F$ from the clock 23.

At the end of a time $T/2$, detected by the comparator 27 as equality of the outputs of the register 25 and counter 24, the signal from the comparator blocks the gate circuit 17 again, interrupting the counting of the graduations in the unit 18. The output of the adding circuit of the unit 18 is destructively read out into the indicator device of the panel 21, and the first result is then indicated as "azimuth reference" on the panel.

Meanwhile the register 26 continues to receive clock pulses at a frequency $F/2$ until the second passage through zero of the adding circuit of the unit 30, that is to say, during a whole cycle of oscillation. At this passage through zero, the output of the register 26 gives the half period actually measured. The corresponding signal from the zero detector circuit 30 causes the following operations: blocking of the gate circuit at the input to the register 26 to interrupt the clock pulses at a frequency $F/2$; transfer to the register 25, previously set to zero, of the output of the register 26 and indication of the half period on the panel 21; reset to zero of the latter register, and the counter 24, and finally unblocking of the gate circuit to enable the clock pulses at a frequency $F/2$ to be passed again to the register 26 for measurement of the next half period.

This signal, which now replaces that from the element 5 to unblock the gate circuits 17 and 29, also causes the beginning of the second measurement cycle by unblocking the gate circuit 17. This cycle is similar to the first, the device 20 providing this time the arithmetic mean of the first two calculations of the azimuth reference and so on.

The teachings of the present invention will be explained now.

Figure 4:
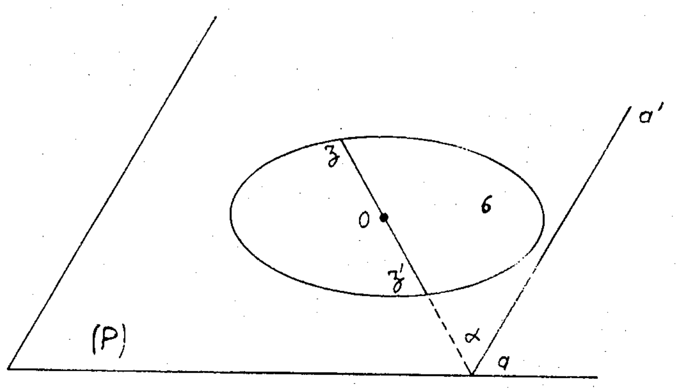
FIGS. 4 and 5 show the principles of the device according to the invention.

The problem consists of numerically determining the angular position of the discs 6, shown schematically in FIG. 4, which disc executes a sinusoidal, alternating. circular, rotary motion in a plane *P* about the centre *O*, in relation to the reference direction aa' which is fixed in the plane *P*, so that it is possible to measure the angle $\alpha$ between a reference direction $zz'$ carried by the disc 6 and the direction $aa'$, at the instant at which the disc occupies a central position between two angular digressions corresponding to an interval of one half period.

An associated problem is that of determining the angle $\alpha$ accurately even if the disc is executing lower-amplitude parasitic motions, in particular rocking motions, which cause its centre *O* to displace in the plane *P*.

Figure 5:
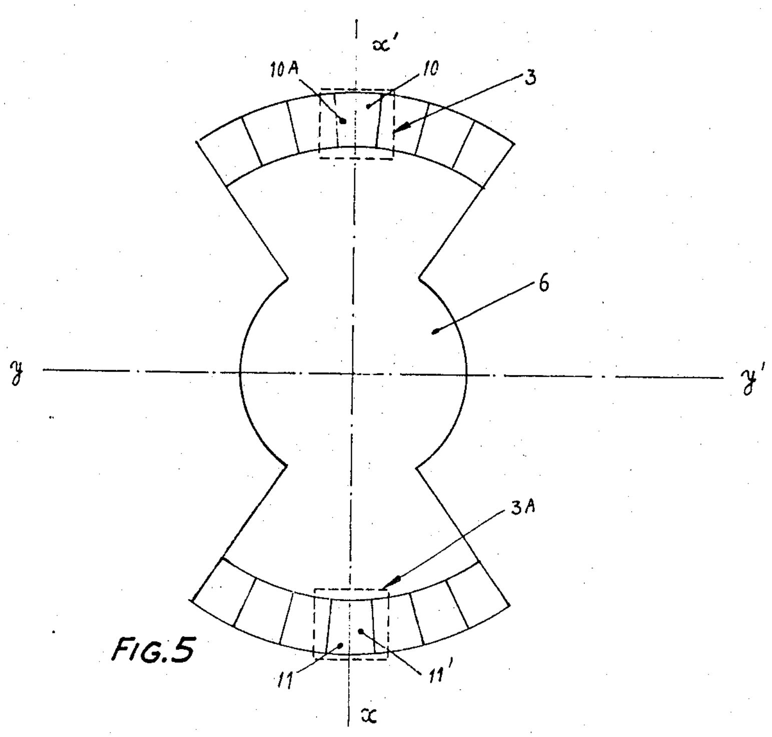

The known device provides a solution to the first of the abovementioned problems in that it describes arrangements making it possible to measure the angular displacements and their directions, as well as the angle $\alpha$. However, it has been found that the determination of the angle $\alpha$ could still be subject to error, this error being introduced by rocking motions on the part of the disc, in particular if the direction of said motions or one of their components, is parallel to the direction $yy'$, that is to say perpendicular to the direction $xx'$ of the axis upon which there are arranged the two diametrically opposite photoelectric pick-up devices 3, 3A, as shown in FIG 5. These rocking motions are then interpreted by these pick-up devices as oppositely directed rotations on the part of the disc, but the corresponding signals are nevertheless added.

In accordance with the present invention, the diagram is modified in the following fashion and as shown in FIG. 6, 10A and 10B, 11C and 11D designating two pairs of electro-luminescent diodes, modulated in each pair at two different frequencies; 8 and 8A indicate the photoelectric detectors corresponding to these diode pairs, which are followed by amplifier and filter circuits 34, 34A tuned to the two modulating frequencies and supplying the pairs of signals respectively marked A and B, C and D. These devices are of the kind described for example in U.S. Pat. No. 3,551,682. Logic circuits 35 and 45, for example those described in FIGS. 9 and 10 of said same patent derived from these pair of signals logic signals $(AB)^+$, $(AB)^-$, and $(CD)^+$, $(CD)^-$ indicating the directions of rotation of the disc at the locations of the pick-up devices 3 and 3A. The reference 36 designates an algebraic adder device for which there are respectively applied the pair of signals A and C and which is controlled by additional logic circuits 39 so that a. the device numerically adds the signals A and C if the logic condition $[(AB)^+ \cdot (CD)^+]V[(AB)^- \cdot (CD)^-] = 1$ is satisfied;

b. the device numerically subtracts the signals A and C if the logic condition:

$$[(AB)^+ \cdot (CD)^-]V[(AB)^- \cdot (CD)^-] = 1$$

is satisfied, the dot and the V sign respectively indicating the logic functions of intersection and joining.

If required, a second algebraic adder 37, controlled in a similar manner by logic circuits 49, can be provided for the signals B and D in order to create a second forward-counting device and thus improves the reliability and accuracy of measurement.

If required, the signals A and C can be timed to allow the previous introduction of direction-indicating signals.

When the disc is rotating, the passage of the graduations produces in the photoelectric devices 3 and 3A the pairs of signals A, B and C, D which appear at the outputs of the circuits 34, 34A, as well as the direction of the indicating signals which appear at the outputs of the circuits 35, 45. However, instead of carrying out algebraic summing in accordance with the known device, the circuit 39, 39 checks that the direction of rotation at the diametrally opposite pick-up points, are indeed the same, in which case the signals A and C or (B and D) are added;

or, if the directions of rotation of these points are opposite, the signals A and C or (B and D) are subtracted in the circuit 36 (or 37).

In this fashion, the accuracy is increased since forward counting excludes any errors due to rocking motions. It is then merely necessary to divide by two the total recorded by each adder 36 or 37, or to divide their totals by 4 to obtain, to within $1 + (Kr/Kg)$, the number of graduations through which the disc 6 has rotated since the start of counting, this as explained above.

Because of its application to the accurate measurement of the angle defined hereinbefore, the invention provides for the replacement of the elements 5A, 5B, for triggering a measurement cycle and disclosed in the known device, by more elaborate arrangements designed to ensure that at the instant of triggering, the disc is executing no parasitic movements and in particular no parasitic movements and in particular no rocking motions parallel to the axis $yy'$ (FIG. 5).

Figure 6:
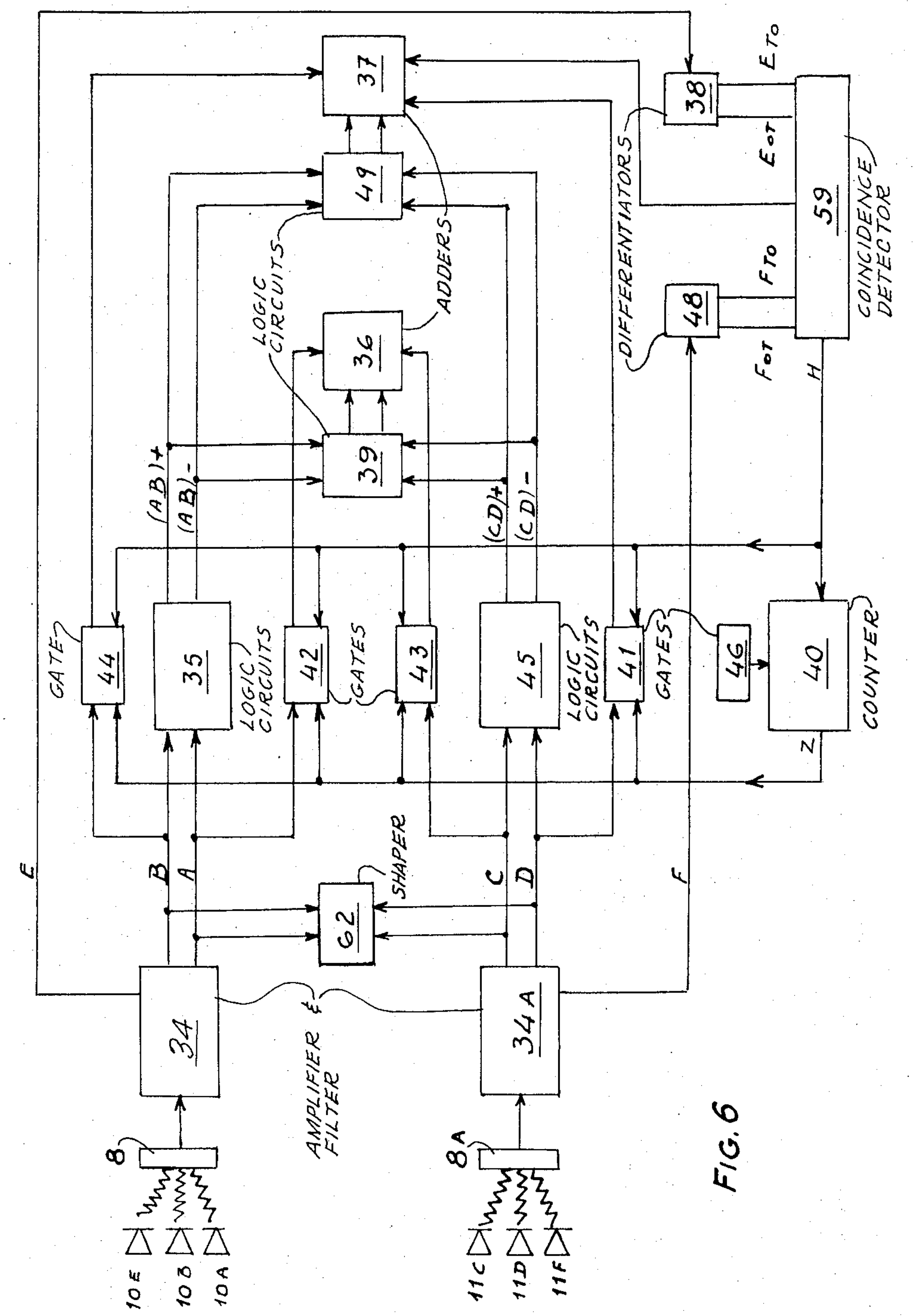
FIG. 6 is a schematic diagram of a device according to the invention.
Figure 7:
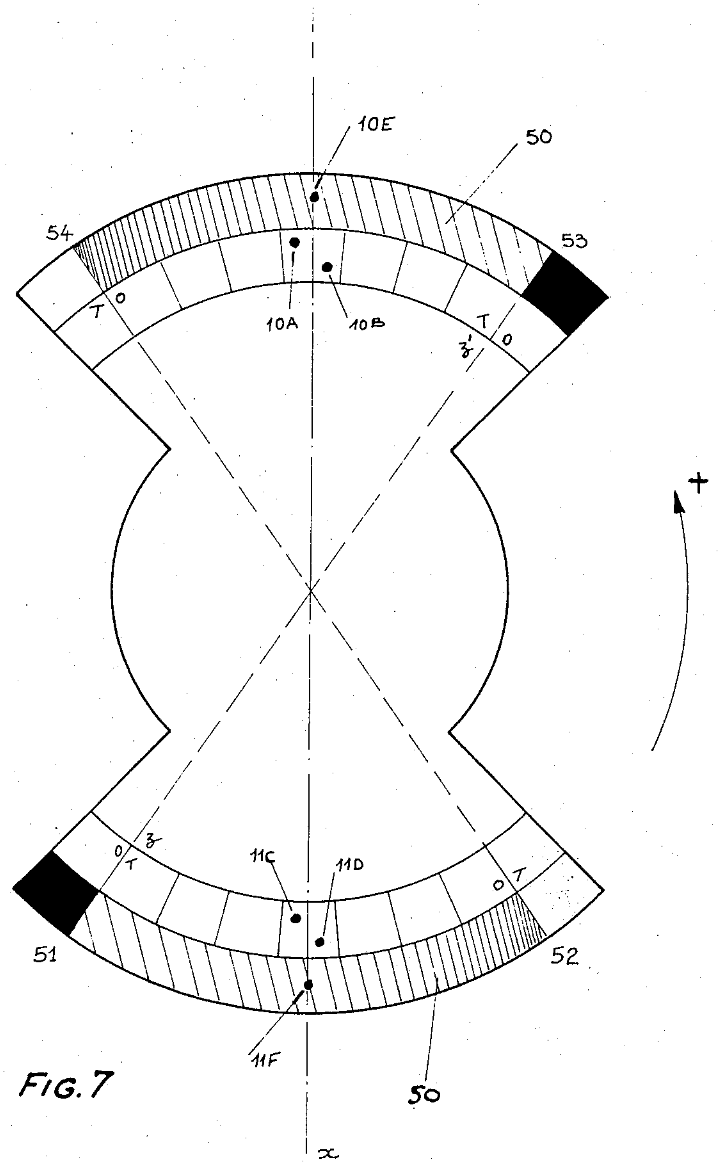
FIG. 7 shows an embodiment of the marks for setting up a measure cycle.

To this end, the circuit of FIG. 6 is supplemented in the following manner:

a third electro-luminescent diode 10E, 10F is provided in each pick-up device 3, 3A and modulated at a third modulating frequency. The disc 6 comprises an internal or external ring 50, which is concentric with an adjacent to, or otherwise, that carrying the graduations, and is furthermore illuminated by the diodes 10E, 10F, this ring exhibiting diametrally opposite transitions 51, 53 and 52, 54 spaced apart by around ten graduations, as FIG. 7 shows, these transitions being opaque-transparent (or OT) transitions, describing the device in the positive sense indicated. After an opaque-transparent transition OT, for example, the transparency progressively diminishes so that the next transition can also be an OT transition.

Returning to FIG. 6, the light fractions issuing from the diodes 10E, 10F are incident, after traversing the ring 50, upon the same photodetectors 8, 8A already used for picking up the graduations and connected to the circuits 34, 34A in which filters tuned to the third modulating frequency are arranged. These latter produce two signals E, F which are applied to two differentiators 38, 48. The resultant derived signals marked $F_{OT}$, $F_{TO}$ and $E_{OT}$, $E_{TO}$, after algebraic amplitude discrimination and depending upon whether it is opaque-transparent transitions OT or transparent-opaque transitions TO which are involved, represent the direction of rotation of the disc at the location of these transitions. A progressive variation in the transparency within one and the same sector, does not in other words produce an effective derived signal which could be confused with the preceding signals.

These signals are processed in the logic circuit 59, which only produces an output signal H if coincidence occurs between a signal $E_{OT}$ and $F_{OT}$, or between a signal $E_{TO}$ and $F_{TO}$, indicating similar directions of rotation of the disc at the location of the transitions in question.

40 designates a backward counter circuit associated with a clock siganl generator 46 and into which there has previously been introduced the predetermined value of the half period, this as set out in the known device. The signal H of circuit 59 triggers the backward counting operation for example by unblocking a gate circuit at the output of the clock 36. This signal is also applied to gate circuits 41 to 44 connected on the other hand to the zero count output of the backward counter circuit 40.

The operation of the device according to the present invention during a measurement cycle thus takes place in the following manner:

the reference *aa'* in the plane P defined by the direction *xx'* (FIG. 5) and the direction *zz'*, this reference making it possible to determine the position of the disc in relation to *xx'*, is chosen as a stright line joining the transitions 51, 53 if the disc moves off in the positive direction, whereas the straight line joining of transitions 52, 54 if the disc moves off in the negative direction.

$\theta$ being the angle between *xx'* and *zz'*, the diagram of FIG. 5 illustrates the rotation $\theta$ of the disc as a function of the time *T* for an initial direction of rotation which has been assumed to be negative. The moving point *M* this indicates the angle of position in relation between *xx'* of the reference *zz'* for the transition 52, 54, whilst the moving point *Q* indicates the position of the transition 51, 53; the ordinate difference between *M* and *Q* is thus equal to the angle subtended by the ring sector comprised between transitions 53, 54 or 51, 52.

The gyroscope having been previously aligned and started after unlocking its rotor, the disc will start to rotate (it has been assumed in this case that the rotation will be negative). On passage of the opaque-transparent transitions 53 and 51, the beams from diodes 10E, 11F will produce in the photoreceivers 8, 8A signals which will be selected by the filters of circuits 34, 34A and directed to the circuits 38, 48 which, under the circumstances, will produce $E_{OT}$ and $F_{OT}$, assuming that the rotation includes no parasitic notions. The circuit 59 emits the signal H which on the one hand triggers the algebraic forward counting of the graduations in the adders 36, 37 by unblocking the circuits 41 to 44, and on the other hand triggers the backward counting of the clock signals by the circuit 40. When the latter has counted back to zero, it in its turn produces a signal Z which blocks the circuits 41 to 44 again.

Figure 8:
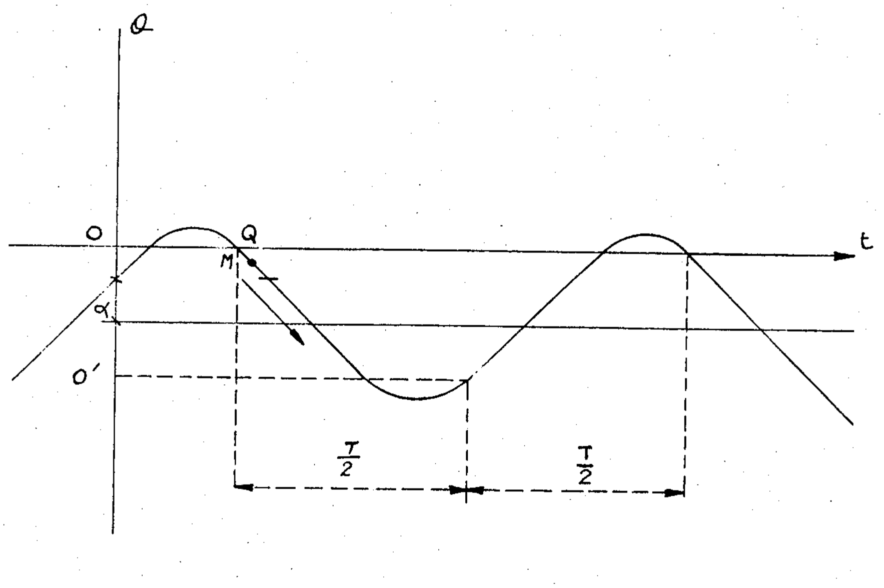
FIG. 8 is a diagram explaining the function of the device.

The circuits 36 and 37 then register numbers of pulses which are in principle identical, representing angular quantities equal to double the angle $\alpha$ sought, this as shown on the diagram of FIG. 8, to within the factor $1 + (Kr/Kg)$.

It should be noted that by angularly moving apart the transitions 51, 53 on the one hand and 52, 54 on the other, prior to the release of the pendular assembly, positions of diodes 10E and 11F make it possible to prevent any false signal E or F being produced as a consequence of a slight transient, parasitic rotary oscillation of the disc, at the instant at which it is released. Nevertheless, it is advisable not to give too large an angular value to the ring sector comprised between the transitions 51, 53 and 52, 54 because this would delay the production of the value of angle $\alpha$ because measurement would only commence when two of the transitions respectively passed opposite the diodes 10E and 11F.

It should also be noted that sectors 51–52, 52–53, 53–54, 54–51 of constant opacity or transparency can be used, which are alternately opaque and transparent; coincidence between the signals $E_{OT}$ and $F_{TO}$, or $E_{TO}$ and $F_{OT}$, then indicates similarity of the directions of rotation and avoids the triggering of a cycle as a consequence of parasitic motions.

Another disposition of the invention makes it possible to eliminate the influence of latitude upon the operation of the device in order to make the measurement independant of the term $1 + (Kr/Kg)$. This is achieved by effectively cancelling the torsional rate *Kr* of the suspension ribbon of the pendular assembly, and consequently the term $(Kr/Kg)$ where *Kg* is the gyroscopic torque factor.

Figure 9:
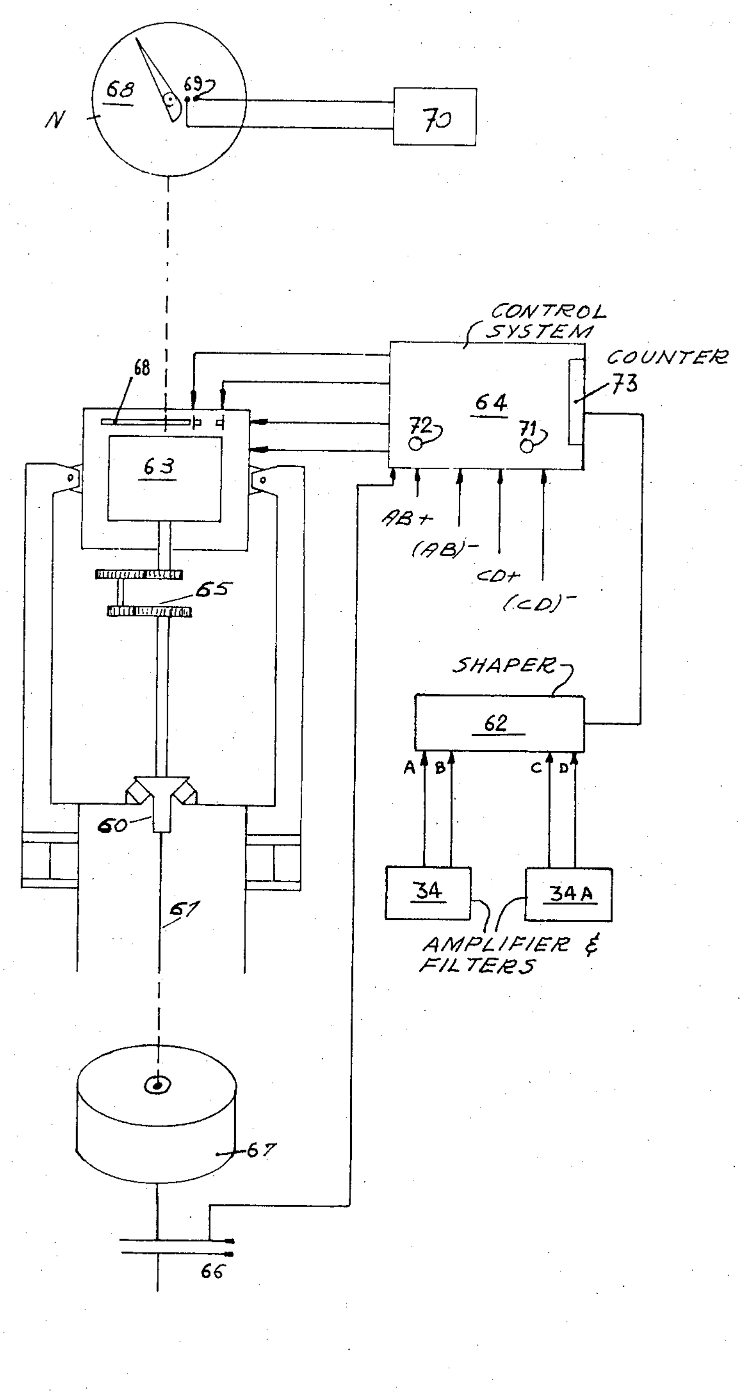
FIG. 9 shows a circuit for cancelling the parametre Kr.

This arrangement essentially consists in releasing the pendular assembly at an angular position which is in all cases constant vis-a-vis the top point of attachment of the ribbon to the frame; referring to FIG. 9, it will be seen that the suspension ribbon 61 is attached at 60 to a shaft mechanically secured to the rotor of a stepping rotor 63 through the medium of a reduction gear 65. This motor, through its logic control system 64 is such is provided, or possibly under the direct control of the signals (AB) and (CD) furnished by the circuits 35 and 45, is supplied with the signals A, B, C, D coming from the circuits 34 and 34A, after the addition of these signals, their division by four and their shaping in a circuit 62. The motor has an angular increment $\omega$ in the ratio $1/n$ of the reduction gear 65 is chosen so that $(\omega/n)$ is equal to the angular interval represented by the pulses emitted by the logic system 54.

The signals (AB) and (CD) must occur in the direction of rotation of the motor so that the point of attachement rotates in the same direction as the pendular part.

It is still necessary for the torsion couple in the ribbon to be effectively zero, at the time of release of the assembly. To check this condition, during assembly, using for example an instrument 68 or an electrical contact 69, the reference position N of the rotor of motor 63 is marked, the motor not producing any oscillation of the pendular assembly when it is released since the gyroscope is not supplied.

In addition, a backward pulse counter 73 acting as a store, is connected to the input of the logic system 64 and makes it possible, after a measurement cycle, to retain the number of steps, and sign thereof, through which the rotor 63 has rotated. The backward counter circuit 73 can be connected to an auxiliary pulse generator (not shown) under the control of a contact breaker 66 operated by the device 67 responsible for locking the pendular system, in order to return it to zero by backward counting. These pulses are simultaneously applied to the motor 63 through its logic system 64.

At the end of a measurement cycle, the locking of the pendular system by the device 67 produces closure of the contact breaker 66. The latter establishes a connection between the auxiliary pulse generator and the backward counter circuit 73, returning the count of the latter progressively to zero and supplying the motor 63 with a suitable number of pulses, of appropriate sign, to restore its rotor to the position N hereinbefore defined. The resetting of the circuit 73 to zero open-circuits the connection with the pulse generator, for example by blocking a gate circuit.

In a variant embodiment, a pushbutton 71 can be used to manually control the pulses which return the motor 63 to its position N, and a switch 72 can be provided to enable the operator to change from automatic operation to manual operation, or vice versa.

It goes without saying that the invention is in no way limited to the embodiments which have been described here by way of example, and that modifications can be made to these without departing from the scope of the invention, in particular its application to the diagram shown in FIG. 3.

To improve reliability, again, in a logic circuit the directions of rotation determined from the signals (AB) and (CD), and those determined from the signals E and F, can be compared in a logic circuit, thus concerning of invalidating the measurement of $\alpha$ depending upon whether these two determinations agree or disagree.

What is claimed is:

1. A gyroscopic north-seeking device of the type including a rotatable disc having sets of diametrically opposed points, two photoelectric devices for detecting the diametrically opposite points of the disc, and two channels for processing the picked up signals, said channels comprising logic circuits which determine the direction of rotation of the disc at each pick-up point, plus at least one device for the algebraic addition of the signals picked up from said points, the improvement comprising: supplementary logic circuits provided at the input of the algebraic adder device to effect the addition or subtraction of the picked up signals as a function of coincidence or non-coincidence, respectively, of the direction of rotation of the disc at the diametrically opposite pick-up points.

2. A device as claimed in claim 1 wherein the disc comprises two diametrically opposite auxiliary markers exhibiting a sudden variation in optical transmissivity, and including differentiating circuits, two photoelectric pick-up devices, which pick up these markers, coupled to the differentiating circuits, and a logic circuit responsive to signals from the differentiating circuits for providing an output signal only if the direction of rotation of said auxiliary markers coincide.

3. A device as claimed in claim 2, wherein said output signal is utilized to trigger a first measurement cycle.

4. A device as claimed in claim 3, wherein said output signal is applied to a backward counter circuit containing a predetermined value for half the period of the cycle and to gating circuits connected to the inputs of the algebraic adder device, said backward counter circuit supplying at its zero count output a signal, indicating the end of the measurement cycle, which is applied to the gating circuits to block them.

5. A device as claimed in claim 2, wherein each photoelectric pick-up device for detecting the graduations and each pick-up device for detecting a marker includes an electroluminescent diode, means for modulating the diode, each of the diodes being modulated at a different frequency, and a single photoelectric detector associated with fitlers tuned to each modulation frequency.

6. A device as claimed in claim 1 having a ribbon attached to a pendular system, and drive means for causing the point of attachment to rotate in order to cancel out the torsional factor of said ribbon.

7. A device as claimed in claim 6 wherein said drive means comprise a stepping motor the amplitude of the rotation of which is a function of signals coming from the algebraic adder device, and whose direction of rotation is determined by the signals coming from the supplementary logic circuits provided at the input of the algebraic adder.

8. A device as claimed in claim 7, wherein the rotor of said motor is fixed to means for marking a reference position coinciding with the starting position of the gyroscope.

9. A device as claimed in claim 8, including means for returning the motor to its refernece position.

10. A device as claimed in claim 9, wherein said means, for returning the motor comprise a backward counter circuit into which signals from the adder are fed, and an auxiliary pulse generator connected to the forward and backward counter and to the stepping motor, said backward counter circuit supplying at its zero count output a signal which causes the auxiliary generator to block.

* * * * *